LOGARITHMIC TRANSFER CIRCUIT

Filed Feb. 21, 1963

JAMES F. GIBBONS
*INVENTOR.*

BY
Flehr and Swain
ATTORNEYS

United States Patent Office 3,237,028

Patented Feb. 22, 1966

3,237,028

LOGARITHMIC TRANSFER CIRCUIT

James F. Gibbons, 735 De Soto Drive, Palo Alto, Calif.

Filed Feb. 21, 1963, Ser. No. 260,275
4 Claims. (Cl. 307—88.5)

This invention relates generally to a logarithmic transfer circuit and more particularly to a logarithmic transfer circuit with wide range logarithmic response.

In many types of analog circuits, it is often required to obtain the log of a voltage or current.

Examples of circuits in which a logarithmic transfer response is useful are logarithmic voltmeters and amplifiers; ratio meters where it is desired to take the ratio of two currents wherein by taking the logarithm of the currents, the logarithmic outputs can be subtracted to give the ratio; in spectrophotometers where it is desired to compare a reference value with an actual value by obtaining a ratio of the outputs; and in analog computations of various types.

It is a general object of the present invention to provide a circuit with logarithmic transfer response.

It is another object of the present invention to provide a circuit with logarithmic transfer response over a wide range of values, for example, in the order of 9 or 10 decades.

It is a further object of the present invention to provide a logarithmic transfer circuit which includes an amplifier including a feedback circuit, the feedback circuit being characterized in that its output current is proportional to an exponential of the input voltage.

It is still a further object of the present invention to provide a circuit with logarithmic transfer response which includes an amplifier having a transistor connected in a feedback circuit.

These and other objects of the invention will become more clearly apparent from the following description when taken in conjunction with the accompanying drawings.

Referring to the drawing.

Figure 1:
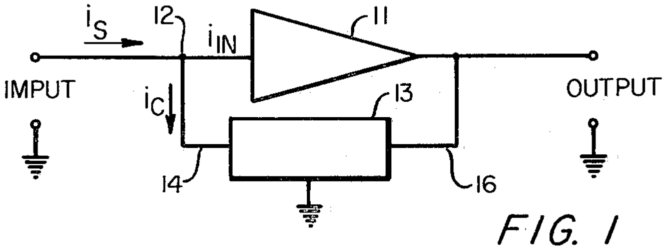
FIGURE 1 is a block diagram showing a circuit in accordance with the invention.

Referring to FIGURE 1, there is shown a circuit which includes a pair of input terminals to which an input voltage may be applied. A resistor is connected in series between one of the input terminals and the input to the amplifier 11. In essence, this combination receives a voltage and provides a current. It is, of course, apparent that the circuit may be connected directly to a current source. The input signal current $i_s$ is shown as being divided at the summing point 12 in two currents $i_{in}$ and $i_c$. The output of the amplifier is connected to the output terminals and is also connected to the feedback network 13 which has its output connected to the summing point 12.

In operation, the amplifier is selected to have a low input current, high input impedance, large dynamic range, low noise and high speed. The amplifier may, for example, be a commercially available amplifier such as Tektronix Type-O operational amplifier. The amplifier serves to amplify a relatively small input signal and provide a greatly amplified output signal. The output signal is applied to the feedback circuit 13 which is selected to have a response such that the current output at its output terminal 14 is related to the voltage at its input terminal 16 by an exponential factor.

As the signal to be transferred is initially applied, a large portion of the current flows to the amplifier 11. The amplified output signal is then applied at the terminal 16 and by the action of the feedback network 13 a current $i_c$ is drawn at the terminal 14. The terminal 14 soon draws a large proportion of the current $i_s$ and only a small portion of the current flows into the amplifier. Eventually, equilibrium is obtained wherein the current to the amplifier is relatively small and a large proportion of the current $i_s$ flows to the feedback circuit. With typical amplifiers, the steady state input current to the amplifier $i_{in}$ may be less than $10^{-12}$ amperes.

Figure 2:
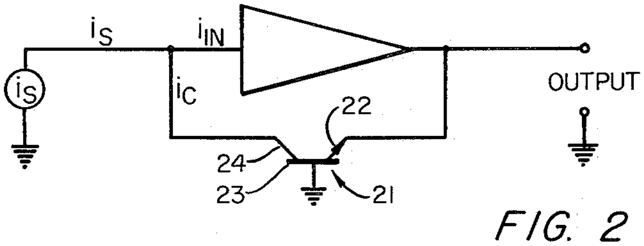
FIGURE 2 is a diagram showing a circuit in accordance with the invention including a transistor in the amplifier feedback circuit.

Referring more specifically to FIGURE 2, the feedback circuit includes a transistor 21 having emitter, base and collector electrodes 22, 23 and 24, respectively. The transistor has a collector current $$I_c = (\text{constant})\ (e^{qV_{eb}/kT}-1)+f(V_{cb})$$

where $V_{eb}$ and $V_{cb}$ are the actual emitter-base and collector-base junction voltages respectively. The semiconductor lattice and manufacturing techniques will determine $f(V_{cb})$ and the constant. However, for $$V_{cb}=0,\ f(V_{cb})$$

is also equal to 0 and for this condition $$I_c = (\text{constant})\ (e^{qV_{eb}/kT}-1)$$

$$\log_e I_c = qV_{eb}/T$$

since for most cases 1 is small in comparison to $$e^{qV_{eb}/kT}$$

$V_{eb}$ is the actual emitter-base junction voltage. If $V_{cb}$ is not exactly zero, the dynamic range of the circuit is reduced, though the operating principles are still the same. A curve of $I_c$ versus $V_{eb}$ with $V_{cb}$ approximately zero shows that this gives a log relationship over relatively wide range of variations of the collector current. The transistor may also be operated in an inverted connection with generally similar operating characteristics.

The amplifier and feedback transistor shown in FIGURE 2 operate to cause the current leaving the summing point to be $$i_s - i_c = i_{in}$$

where $i_{in}$ can be made quite small using standard techniques. The amplifier produces a sufficient forward bias on the emitter-base junction to cause the collector current of the transistor to be essentially equal to the source current $i_s$. The ouput voltage $E_{out}$ is equal to $V_{eb}$, which is proportional to the log of the collector current $i_c$ which has been established. The voltage at the input node will be the output voltage $E_{out}$ divided by the voltage gain of the amplifier $A_v$. $A_v$ can be made large by standard techniques so that the input voltage, which is essentially $V_{cb}$, can be made nearly zero. By adding suitable padding resistors the voltage $V_{cb}$ can be made exactly zero for certain transistor types.

Figures 3, 4:
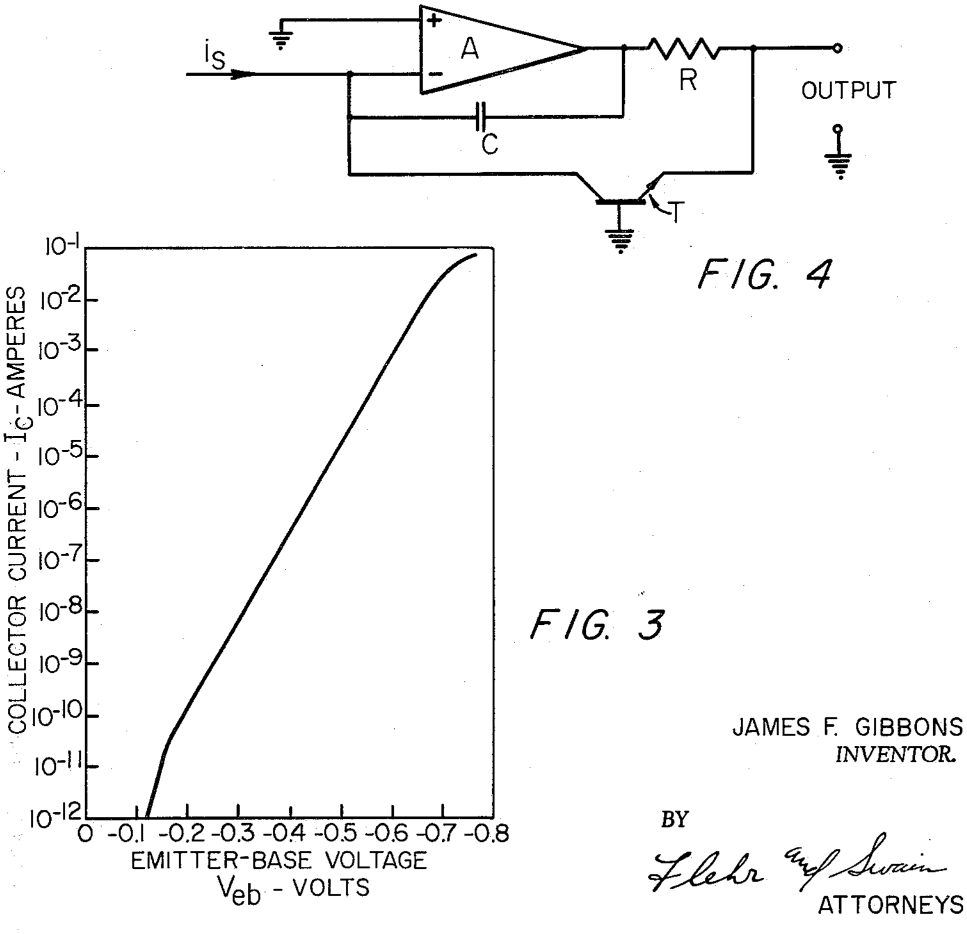
FIGURE 3 is a curve showing the relationship between collector current $I_c$ and emitter-base voltage $V_{eb}$ of a transistor.
FIGURE 4 is a circuit which has been assembled and operated.

Referring to FIGURE 3, the characteristics of a typical silicon transistor are shown. It is seen that there is a linear response over a 9 decade range or more. By employing trimming resistors and the like, it is possible to extend this range even beyond this value.

For other types of transistors, the range may be greater than or less than the range for the silicon transistor shown. However, in all events, the relationship of collector current to the emitter-base voltage is logarithmic over a selected range and transistors may be connected in the feedback circuit to give an output voltage which is proportional to the log of current.

A specific circuit of the form of FIGURE 2 is shown in FIGURE 4, said circuit having performed the required logarithmic transfer condition over 9 decades. The circuit shown includes an amplifier designated 11 which in the specific example was a Tektronix Type-O operational amplifier. The resistor R was 1000 ohms, the capacitor C was 10 pf., and the transistor T was known by manufacturers specification as a 2N995. The resistor R served to minimize variations in resistance of the transistor in high current ranges and the capacitor C served to stabilize the circuit.

I claim:

1. A logarithmic transfer circuit of the character described comprising an amplifier having a pair of input and a pair of output terminals, means for applying an input signal current to said transfer circuit, a feedback transistor having emitter, base and collector terminals, said transistor having its base terminal directly connected to a point which is common to one of the input and one of the output terminals of the amplifier, one of the other terminals of said transistor being directly connected to the other input terminal of the amplifier to supply a current of opposite polarity to the input signal current and having substantially the same magnitude as the input signal current over the entire range of signal currents, and the other terminal of the transistor connected to receive a voltage which is proportional to the output voltage of the amplifier whereby the output voltage is proportional to the logarithm of the input current.

2. A logarithmic transfer circuit as in claim 1 in which said transistor is a silicon transistor.

3. A logarithmic transfer circuit as in claim 1 in which the collector terminal of said transistor is connected to supply current to the input of the amplifier and the emitter terminal is connected to receive the voltage proportional to the output voltage.

4. A logarithmic transfer circuit as in claim 1 in which the base-collector voltage is substantially equal to zero.

References Cited by the Examiner

UNITED STATES PATENTS

| | | | |
|---|---|---|---|
| 2,877,348 | 3/1959 | Wade et al. | 328—145 |
| 2,921,193 | 1/1960 | Eckert et al. | 328—175 |
| 2,999,169 | 9/1961 | Feiner | 328—175 |
| 3,108,197 | 10/1963 | Levin | 328—145 |
| 3,113,219 | 12/1963 | Gilmore | 307—88.5 |

JOHN W. HUCKERT, *Primary Examiner.*

DAVID J. GALVIN, *Examiner.*

R. DZIURGOT, *Assistant Examiner.*